United States Patent [19]

Koivunen

[11] 3,779,137

[45] Dec. 18, 1973

[54] HYDROSTATIC TILT BOX BEARING

[75] Inventor: Erkki A. Koivunen, Livonia, Mich.

[73] Assignee: General Motors Corporation, Detroit, Mich.

[22] Filed: Sept. 27, 1971

[21] Appl. No.: 183,959

[52] U.S. Cl. .................................. 91/489, 91/506
[51] Int. Cl. ........................................... F01b 13/04
[58] Field of Search.................... 91/485, 499, 505, 91/506, 489

[56] References Cited
UNITED STATES PATENTS

| | | | |
|---|---|---|---|
| 3,682,044 | 8/1972 | Ankeny et al. | 91/506 |
| 2,298,850 | 10/1942 | Vickers | 91/487 |
| 3,124,008 | 3/1964 | Firth et al. | 91/506 |
| 2,967,491 | 1/1961 | Wiggermann | 91/505 |
| 3,631,764 | 1/1972 | Lucien | 417/222 |
| 3,110,267 | 11/1963 | Vetter | 91/485 |
| 2,987,006 | 6/1961 | Bowers et al. | 91/485 |
| 3,585,901 | 6/1971 | Moon | 91/499 |
| 3,650,180 | 3/1972 | Gantschnigg et al. | 91/488 |

FOREIGN PATENTS OR APPLICATIONS

| | | | |
|---|---|---|---|
| 1,906,800 | 2/1969 | Germany | 91/506 |

Primary Examiner—William L. Freeh
Assistant Examiner—Gregory Paul LaPointe
Attorney—W. E. Finken et al.

[57] ABSTRACT

A hydrostatic pump or motor unit of the axial piston type having a tilt box supporting the annular swash plate for reciprocating the piston in which the tilt box has a hydrostatic bearing pressurized by the power circuit pressure. The hydrostatic bearing has a semi-cylindrical bearing on each side of the machine axis and each of these semi-cylindrical hydrostatic bearings have three pressure pockets. The connections from the power circuit pressure source are arranged so that the high power circuit pressure is supplied to three pockets of the bearing having the higher load and to one pocket of the bearing having the lower load while the low pressure is supplied to the remaining two pockets. When the operation of the machine is reversed to interchange the high and low pressure line, the pressurizing of the pockets in the cylindrical bearings is reversed to proportionally support the bearings in accordance with the load thereon.

17 Claims, 9 Drawing Figures

INVENTOR.
Erkki A. Koivunen
BY
A. M. Heiter
ATTORNEY

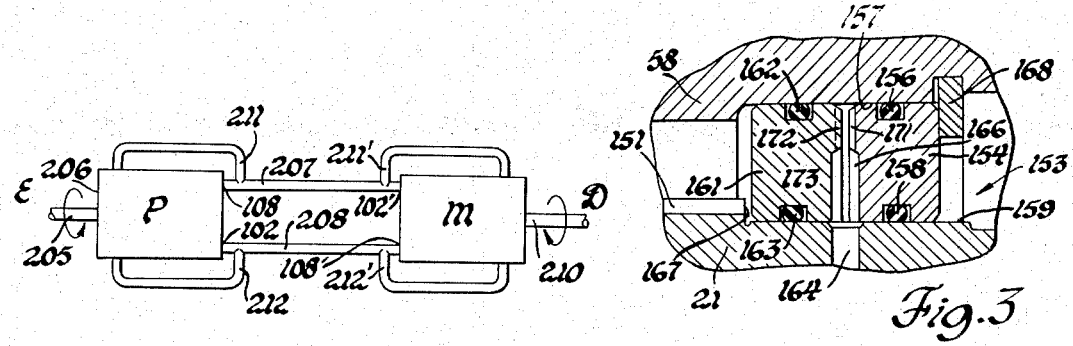
Fig.2
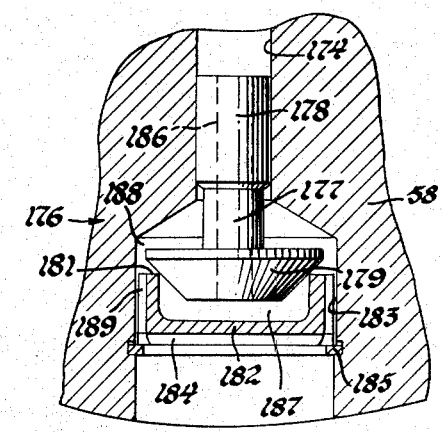
Fig.3
Fig.4
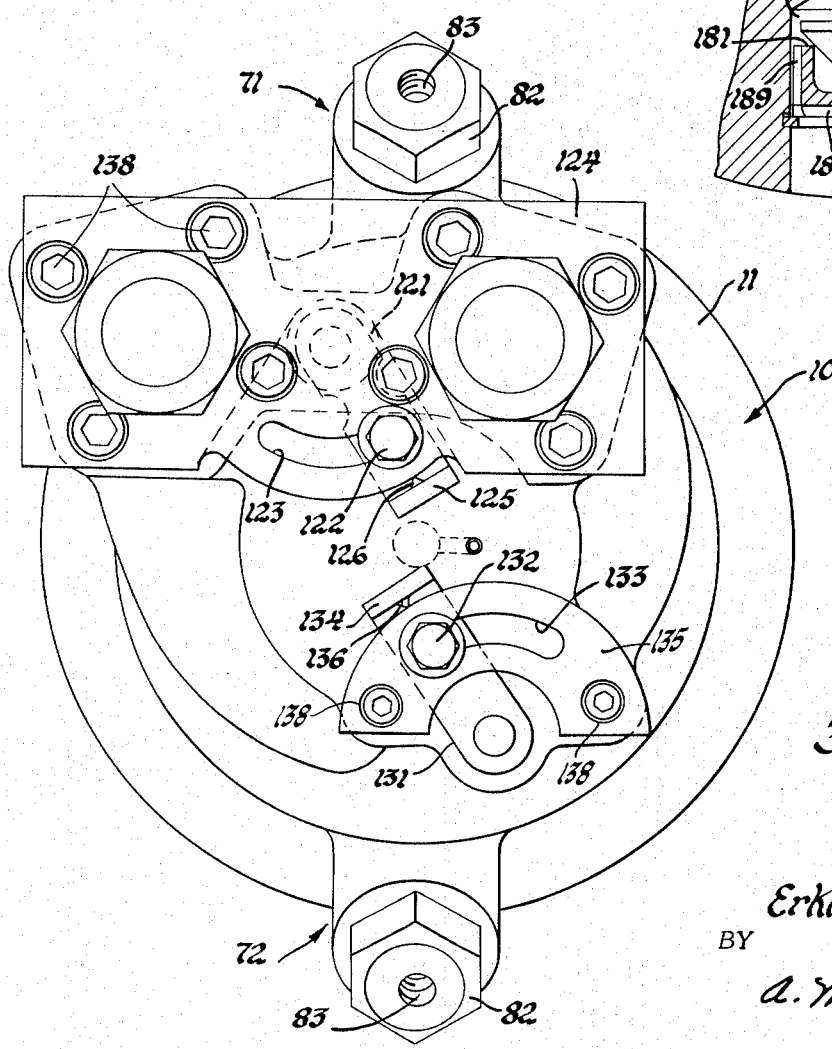
Fig.5
INVENTOR.
Erkki A. Koivunen
BY
a. M. Heiter
ATTORNEY

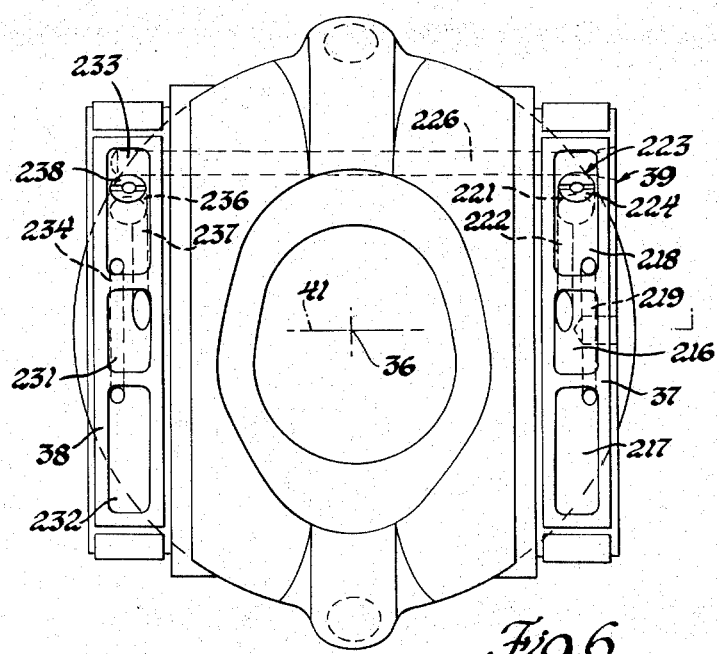
Fig.6
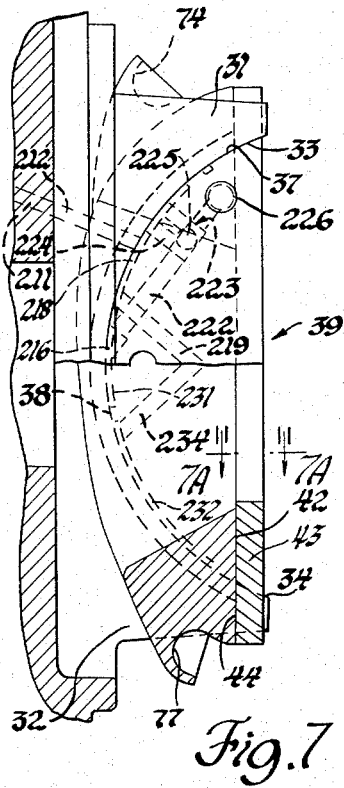
Fig.7
Fig.7A
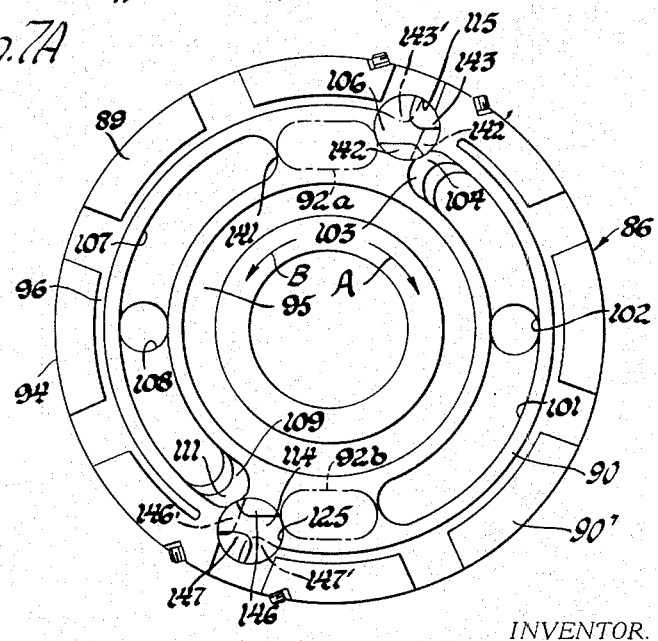
Fig.8
INVENTOR.
Erkki A. Koivunen
BY
a. M. Weiter
ATTORNEY

HYDROSTATIC TILT BOX BEARING

This invention relates to hydrostatic converters and particularly to a hydrostatic bearing for a tilt box of a hydrostatic pump or motor unit.

In hydrostatic converters such as the pump or motor units employed in hydrostatic transmissions having axial pistons with slippers engaging a tilt box having a swash plate surface for reciprocating the pistons, it is important that the bearing for rotatably mounting the tilt box to adjust its position to vary the capacity of the pump or motor unit, be substantially friction free so that the hydraulic controls for positioning the tilt box can function quickly and accurately in response to low level control forces. To accomplish this, the tilt box is mounted on two semi-cylindrical hydrostatic bearings located on opposite sides of the machine axis. The bearing aligned with the high pressure port has a high loading and the bearing aligned with the low pressure port has a low loading. The high and low pressure ports and the resultant bearing loading is reversed by operating changes such as reversal of tilt box angle, reversal of direction of input drive to a pump and change from pump to motor operation. The high pressure from the power circuit of a pump-motor transmission such as the supply passage connecting the pump outlet to the motor inlet when the pump drives the motor is connected to three pockets on the side having the high loading and to one pocket on the side having the low loading and the low pressure from the return power circuit passage is connected to the remaining two pockets of the bearing having the low loading. When the operation of the machine is reversed, such as a change from drive to overrun so the motor drives the pump, the high and low power circuit pressure lines are reversed. The hydrostatic bearing pressure control responds to the pressure reversal and connects the high pressure to all three pockets of the other semi-cylindrical bearing which is now the high load bearing and to one of the pockets of the low load bearing and the low pressure portion of the power circuit to the other two pockets of the low load bearings. Thus the load carrying capacity of each hydrostatic bearing is proportional to the load on each bearing because the hydrostatic bearing supply pressure supplied from the high and low power circuit pressures varies with the load on the bearing and the bearing on the high pressure side of the machine has a larger hydrostatic bearing area supplied with high pressure while the bearing on the other side having the lower load has less area with high pressure and some area with low pressure. This arrangement of high pressure and low pressure pockets is reversed when the machine operation is reversed and the loading is reversed.

An object of the invention is to provide in a hydrostatic machine an improved hydrostatic bearing having its load capacity distribution controlled by the direction of operation of the machine.

Another object of the invention is to provide in a hydrostatic machine an improved hydrostatic bearing having a loading capacity distribution on portions thereof controlled by the load on the portions of the bearing.

Another object of the invention is to provide in a hydrostatic machine a hydrostatic bearing having a plurality of pockets selectively supplied with either high or low pressure fluid in accordance with the bearing loading during different phases of operation of the machine to vary load capacity distribution.

Another object of the invention is to provide in a hydrostatic machine of the axial piston type having a tilt box supported by a pair of cylindrical bearings each having three hydrostatic fluid pockets in which, when the machine operates in one direction, all three pockets in one bearing are supplied with high pressure and in the other bearing one pocket with high pressure and the other two pockets with low pressure and on reversal of the operation of the machine, the supply of fluid pressure to the pockets is also reversed.

These and other objects of the invention will be more apparent from the description and the drawing in which;

FIG. 2 is a schematic diagram of a pump motor hydrostatic transmission.

FIG. 3 is a detail view of the biasing pistons.

FIG. 4 is a detail view of a governor valve.

FIG. 5 is an end view of FIG. 1 on line 5—5.

FIG. 6 is a view of the tilt box particularly showing its bearing portion.

FIG. 7 is a sectional view on the line 7—7 of FIG. 6 showing the tilt box bearing seated on the housing bearing.

FIG. 7A is a fragmentary section on line 7A—7A of FIG. 7.

FIG. 8 is a view of the valve plate on section line 8—8 of FIG. 1.

Figure 1:
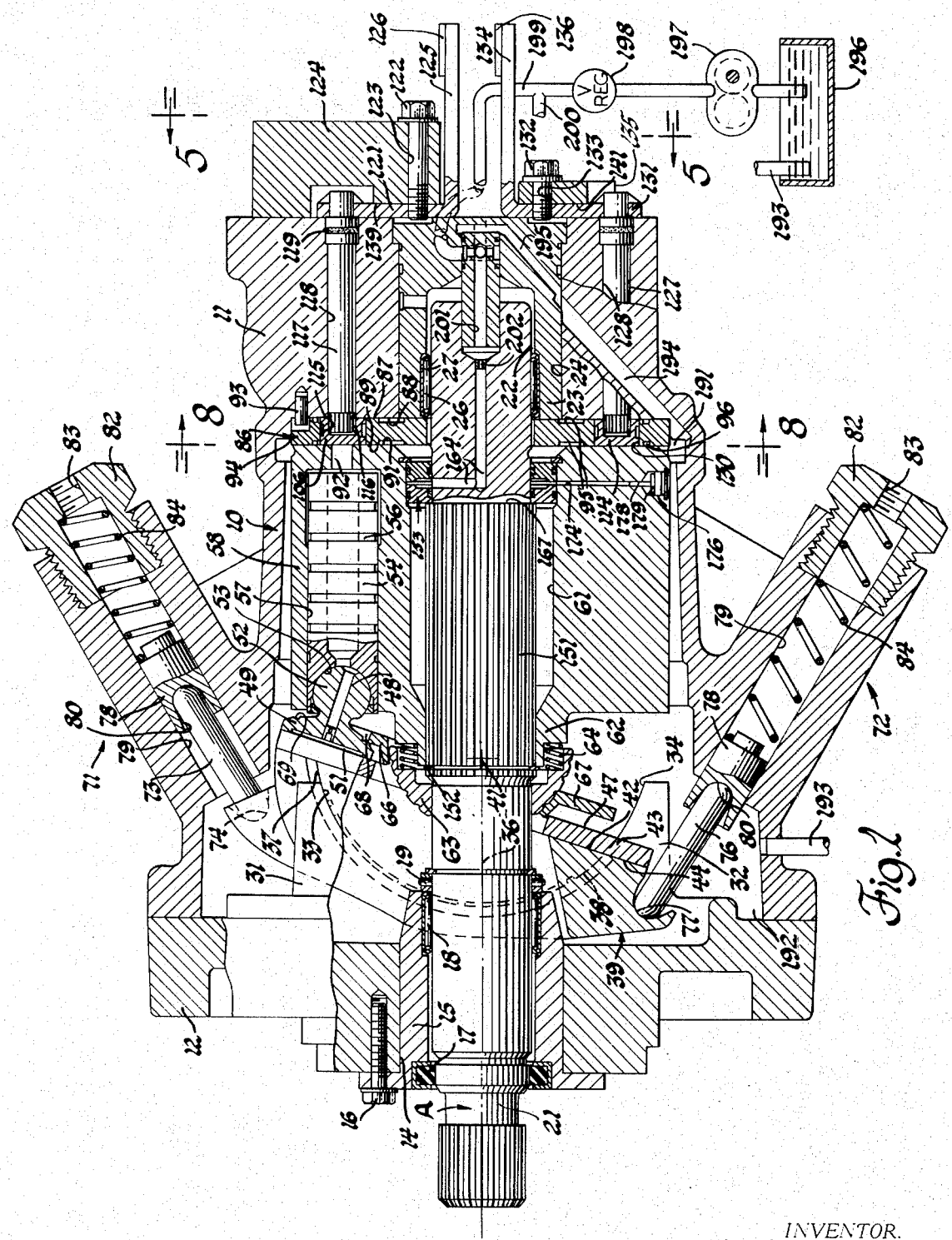
FIG. 1 is a sectional view showing a pump or motor hydrostatic unit.

The hydrostatic converter, a hydrostatic pump or motor unit, shown in FIG. 1, may be used as either the pump or motor in the system or transmission shown diagrammatically in FIG. 2. Referring to FIG. 1, the hydrostatic converter has a barrel shaped housing 10, having an integral valve supporting end wall 11 at the valve end and a shaft end support wall 12 at the shaft end suitably secured by bolts and sealed to close the open end of the barrel housing 10. The closure wall 12 has a central opening 14 to receive the adapter, or bushing 15, which is secured by suitable fasteners 16 to the wall 12. The shaft end wall 12 with adapter 15 supports the shaft seal 17, rotary bearing 18, and thrust bearing 19 which rotatably and axially support and locate shaft 21 in the shaft end wall 12. The shaft 21 also extends at its other end into a bore 22 in a cylindrical support member 23 secured and sealed, as described below, in opening 24 in the valve end wall 11. The rear end of shaft 21 is supported by a bearing 26 located in a recess 27 in the bore 22.

On the inside face of the shaft end wall 12, there are formed, or secured, a pair of semi-cylindrical bearing members 31 and 32 having respectively the plane semi-cylindrical bearing surfaces 33 and 34 which extend vertically and are located on opposite sides of, and equidistant from, the axis 36 of the machine and shaft 21 and are parallel to each other. These plane semi-cylindrical bearing surfaces 33 on the near side and 34 on the far side of the shaft in FIG. 1 cooperate with hydrostatic bearing surfaces 37 and 38 respectively, on the tilt box 39 described below with reference also to FIGS. 6 and 7. The tilt box 39 is thus supported by the aforesaid semi-cylindrical hydrostatic bearings for rotation about a horizontal axis 41 perpendicular to axis 36. The tilt box 39 is an annular member having considerable depth in an axial direction for rigidity and has a flat annular bearing surface 42. The annular wear or swash plate 43 has one annular bearing surface 44 in engagement with the bearing surface 42 on the tilt box to rotatably support the wear plate on the tilt box. The tilt box has an internal cylindrical bearing surface 46 at the perimeter, FIG. 7A, interrupted at the actuator sockets, to retain the wear plate 43 in position for its rotary movement relative to the tilt box.

The other annular bearing surface 47 on the wear plate slidably supports the slippers 48 which have a foot portion 49 with a hydrostatic bearing recess 51 within a circular bearing surface engaging the annular bearing surface 47 and a ball portion 52 fitting, and suitably retained in, a socket 53 of the piston 54. The piston 54 has suitable sealing grooves 56 and fits in a cylinder 57 in the rotor, or rotary cylinder block, 58. The block 58 contains a plurality of cylinders with a piston assembly in each cylinder. The illustrative embodiment has nine cylinders spaced about the machine axis. The block has a central opening 61 having a splined portion 62 of smaller diameter adjacent the end of the block next to the wear plate. A spherical bearing member 63 is suitably mounted on the shaft and biased by a plurality of coil springs 64 toward the tilt box. The spherical bearing surface has oil grooves and supports the spherical bearing portion 66 of the retainer plate 67. The retainer plate 67 has a recess 68 for each slipper fitting around the central portion of the slipper and engaging an annular surface 69 on the slipper foot to retain the slipper in contact with the wear plate by the bias of spring 64 when fluid pressure in the cylinder does not.

The tilt box 39 is rotated on the bearings 33, 34, about the axis 41 by hydraulic actuators 71 and 72 which respectively actuate the top actuator rod 73 fitting into socket 74 on the tilt box and actuator rod 76 fitting into socket 77 on the lower portion of the tilt box. The hydraulic actuators 71, 72 are identical and each has a piston 78 reciprocatable in a bore 79 and a socket 80 fitting its rod. The bore 79 has an end closure cap 82 threadably secured and sealed to the housing and having a continuation of bore 79 and a threaded port 83 to receive a fitting of a hydraulic line. A spring 84 is located in the bore and abuts the closure cap to resiliently bias the piston to engage the actuator rod in its sockets to provide a bias positioning the tilt box in the neutral or zero angle position. Suitable controls supply actuator pressure via ports 83 to the bores 79 of the actuators 71 and 72 to position the tilt box to a desired angle. It is preferred that one pressure be used to tilt the tilt box, i.e., actuator pressure to actuator 72 to tilt the tilt box from neutral to the position shown, while actuator pressure to actuator 71 would be used to move the tilt box from the position shown toward neutral position and beyond to a reverse pumping position. When the tilt box is in the position perpendicular to the unit axis 36 there is no pump or motor operation. The tilt box can be moved clockwise or counterclockwise to provide, in response to the same direction of input rotation, a pumping action in the opposite direction between the supply and return lines and motor operation in response to fluid supply in one direction to produce opposite directions of rotation.

The valve plate 86, FIGS. 1 and 8, is located between the valve end wall 11 of the housing and the rotary cylinder block 58 and has a bearing and sealing surface 87 engaging the bearing and sealing surface 88 on the wall 11 and then on the opposite side, a bearing and sealing surface 89 engaging the bearing and sealing surface 91 on the end of the cylinder block. These bearing and sealing surfaces are annular. A port 92 connects each cylinder 57 through the end of the cylinder block and its bearing surface 91. A pin 93 in the end wall 11 fits in a radial slot in the valve plate 86 to prevent rotation of the valve plate 86 and permit its seating on the sealing and bearing surfaces between end wall 11 and cylinder block 58. The valve plate perimeter and shoulder 94 have bearing engagement to radially locate the valve plate in the housing. A radially inner annular groove 95 and a radially outer annular groove 96 on each opposite face of the valve plate define an annular sealing and bearing surface area or pad, one on each side of the valve plate. The inner grooves 95 are vented toward the center end the outer grooves 96 have radial portions for venting to the outer perimeter of the valve plate. The sealing bearing surface 89 nonrotatably engages surface 88 on wall 11 and functions as hydrostatic sealing bearing and may float to insure good axial alignment. While the grooves in both sealing bearing surfaces 87 and 89 divide the surface into an annular portion 90 and a plurality of radial outer pad portions 90', the sealing bearing surface 89, since it engages the rotating surface 91 on the cylinder block functions as a hydrokinetic bearing and pad portions 90' provide a greater separating effect. The ports 92 in the cylinder block 58, the ports 101 and 107 in the valve plate 86 and the main pressure ports 102 and 108 in end wall 11 are within these sealing bearing surfaces to prevent exhaust or limit leakage to a low value to the interior of housing 10.

When the shaft 21 is driven in a clockwise direction, as viewed from the front of the unit, as indicated by the arrow A, FIGS. 1 and 8, and the tilt box is tilted as shown in FIG. 1, the cylinder block 58 rotates in this direction relative to the stationary valve plate 86 and the valves are functional as described for a pump as follows. The lozenge shaped port 101 is the low pressure inlet port and is faired into an inlet or return passage 102. The initially opening end 103 of port 102 has a tapered initial small volume slot portion 104 cooperating with the rotary predecompression timing valve 106. At the other side of the valve plate 86 there is the lozenge shaped high pressure port 107 which is faired into the high pressure supply line 108. At the initially opening end 109 of port 107, there is also a shallow step portion 111 cooperating with the precompression timing valve 114.

The rotary predecompression valve 106 has a sealing rotatable fit in bore 115 and is connected by splines 116 to the shaft 117 rotatably mounted in bore 118 in end wall 11, and sealed by seal 119. The shaft 117 extends through the end wall 11 and is secured and fixed, as by welding, to a radially extending portion of lever 121 and secured in any one of a number of adjustable positions by the bolt 122 which passes through the quadrant slot 123 in support 124 and is screwed into the radial lever portion. The lever 121 has an axial portion 125 having a pointer 126 to accurately set the rotary position of timing valve 106. The precompression rotary timing valve 114 similarly fits bore 130 and is splined to the shaft 127 rotatable in bore 128 and similarly sealed and fixed to a radial portion of control lever 131 which is similarly adjustably positioned by the securing bolt 132 which passes through a quadrant slot 133 in support 135. The lever 131 has also an axial portion 134 with a pointer 136 for setting the adjusted rotary position of valve 114. The support brackets 124 and 135 are secured to the end wall 11 by bolts 138 and have surfaces 139 and 141 against which the levers are clamped by the bolts 122 and 132 to axially locate the levers 121 and 131. The rotary timing valves 106 and 114 have the same thickness as the valve plate 86 and are splined to shafts 118 and 127 to permit relative axial movement so the face surfaces align with surfaces 87 and 89 on the valve plate 86 and the periphery has a recess seal to bore 115 and 130 respectively. The face, which contacts the cylinder block, of timing valve 106 has a shallow port recess 142, shown in full line, at the minimum predecompression position. The port recess has a wide end and thus large flow capacity end open to low pressure port 101 at end 103 and an opposite small pointed or apex end close to the cylinder block port 92 in the top dead center position 92a in dotted line FIG. 8. The shallow exhaust recess 143, shown in full line, is a relief to the radial portion of the peripheral exhaust passage 96 on the valve plate side facing the cylinder block to reduce the area on the side facing the cylinder block acted on by hydraulic pressure to obtain good balance of the pressures on opposite sides of the rotary valve 106. The rotary timing valve 106 is rotatable, i.e., 65°, to position the port recess 142 and exhaust recess 143 in the dotted line positions 142' and 143'. This rotation of valve 106 gradually increases predecompression to a maximum predecompression position, the point at which the opening of port 92 to low pressure port 101 is not advanced. The exhaust recess functions the same in all positions.

The precompression valve 114 has a port recess 146 and an exhaust recess 147 and is similarly rotatable from the minimum precompression position 146–147, shown in full lines, to the maximum precompression position, shown in dotted lines 146'–147'. The port recess connects the high pressure port 107 through the low flow capacity apex and substantially at bottom dead center position 92b of port 92 so there is minimum precompression. Turning the precompression valve increases the precompression to a maximum in the dotted line precompression position where there is compression until cylinder port 92 reaches the high pressure port 107. The exhaust recess 147 functions like exhaust recess 143.

When the hydrostatic unit operates as a pump, driven for rotation in the direction of the arrows A in FIGS. 1 and 8, and the tilt box angle is as shown in FIG. 1, when the port 92 of one cylinder has just passed the trailing edge portion 141 of high pressure port 107, the top dead center position 92a, the small volume of fluid remaining in the cylinder and port 92 below the piston at its full compression stroke position is under high pressure and begins to decompress or lower the pressure as the piston moves past the top dead center position and the cylinder retracts increasing the volume in the cylinder and port and thus decreasing the pressure therein proportional to the degree of movement past the top dead center position. This pressure in the cylinder and its port 92 also decreases due to leakage between the surface seals 89 and 91 on the valve plate and cylinder block respectively proportional to the pressure therein and the time until the port 92 is opened to port 101 to equalize the pressure. With the predecompression valve 106 in the rotary position shown in solid lines in FIG. 8, the predecompression recess 142 in the valve face 106 immediately provides at its apex a small capacity flow connection, or low volume flow connection, through the end portion 103 of the low pressure port 101 to gradually equalize the pressure in port 92 with the pressure in port 101. When valve 106 is rotated toward or to the dotted line position 142' the apex of recess 142 is moved toward or to the initially opening end 103 of port 101. Thus, this rotation of predecompression valve 106 provides increasing movement of each cylinder and its port 92 past top dead center for increasing decompression or reduction of the pressure therein to reduce this pressure to the pressure in the low pressure port 101 before cylinder port 92 is connected to low pressure port 101. This pressure reduction is provided both by return stroking of the piston and leakage. Thus the number of degrees of movement of the port 92 in a predecompression phase is preset in order that the pressure in port 92 equals the pressure in port 101 when they open to each other for fluid communication.

With the hydrostatic unit operating as a pump and rotating in the direction of arrow A, the precompression valve 114 functions to increase the low pressure in the cylinder and port 92 to the high pressure in the high pressure port 107 when they are connected. When the precompression timing valve is rotated to the dotted line position, the maximum precompression position, with the port recess in the 142' dotted line position, the port 92 must move from the bottom dead center position 92b dotted line, FIG. 8, until the leading edge opens to high pressure port 107. During this rotary movement the piston 54 will move or stroke compressing the fluid and increasing the pressure of the fluid in the cylinder and port 92 a maximum amount. When precompression valve 114 is rotated about 65° toward the full line position to place the port recess in the 142 position, the precompression is reduced to a minimum and the flow capacity on initial opening of cylinder port 92 to high pressure port 107 has a very low flow capacity since only the apex of the triangular recess 142 is initially open. The precompression valve is set at the position in which the pressure in the cylinder and port 92 is equal to the pressure in the high pressure port 107 so there is no surge of fluid causing noise when these ports are connected and if there is any variation from this condition the initial opening has a low flow volume or is restricted to damp any fluid surge for quiet operation. Since leakage on precompression reduces the pressure rise the degree or distance of precompression travel and stroking is more than the degree or distance of predecompression travel.

With the hydrostatic unit acting as a pump with the shaft driven in the same direction A and the tilt box angle reversed from that shown in FIG. 1, the direction of pumping will be reversed, low pressure will enter main port 107 and high pressure will be delivered to main port 101. Then the rotary timing valve 106 will function as a precompression valve as described above in relation to timing valve 114 and the timing valve 114 will function as a predecompression valve as described above in relation to timing valve 106. When the hydrostatic unit acts as a motor with high pressure supplied to port 101 and the tilt box angle reversed from that shown in FIG. 1, the unit will rotate as a motor driving in the direction of arrow B (FIG. 8), and timing valve 106 will act as a predecompression valve and timing valve 114 will act as a precompression valve as explained in detail above. If high pressure is supplied to port 107 and the tilt box angle is as shown in FIG. 1, the motor will be driven in the direction of arrow B and the function of the timing valves will be the opposite of the above detailed description, valve 114 will be a predecompression valve and valve 106 will be a precompression valve.

From the above it will be seen that in a pump, the timing events, precompression and predecompression occur at the valve main port opening and thus the precompression and predecompression valves are located adjacent the opening end of the main ports. When the hydrostatic unit operates as a motor, the timing events occur at the valve port closing and the timing valves are located adjacent the closing ends of the main ports. This arrangement of timing valves will function for one direction of rotation for pump operation and the opposite direction of rotation for motor operation.

The splined small diameter portion 62 of cylinder block 58 is splined to the splines 151 on the shaft 21. valve splines permit a small freedom of movement between the cylinder block and shaft so the block is free to seat on the valve plate. The cylinder block movement away from the valve face is limited by the snap ring 152 but the snap ring is not normally loaded since the biasing device 153 normally biases the cylinder block to contact the valve plate. The biasing device, shown in FIGS. 1 and 3, has a first annular piston 154 having an outer diameter seal 156 with a cylindrical surface 157 on the inner diameter of the cylinder block and inner diameter seal 158 with an outer diameter surface 159 on the shaft 21. A second piston 161 has an outer diameter seal 162 with surface 157 and an inner diameter seal 163 with a shaft surface 159. When fluid is supplied under pressure via the inlet passage 164 in shaft 21, to the space 166 between the two pistons, the piston 161 abuts shoulder 167 on the shaft and piston 154 engages snap ring 168 in the cylinder block, biasing the cylinder block against the valve plate with a force proportional to the fluid pressure therein. At the outer diameter of the pistons 154, 161, each has an annular ring projection 171 and 172 respectively which have a plurality of recesses 173 at the facing surfaces thereof, which keep the pistons spaced apart so the connection to the inlet passage 164 and governor feed passage 174 is never blocked by the pistons. The governor feed passage 174 extends through the cylinder block between cylinders to the governor valve 176.

The governor valve 176, FIG. 4, has a movable valve element 177 having a stem 178 reciprocably mounted in valve sealing relation in the bore or passage 174 and a head portion 179 cooperating with the sealing edge 181 on a fixed seat member 182 positioned in an enlarged bore portion 183 of the bore 174 with sufficient clearance to provide an exhaust passage between seat member 182 and bore portion 183 to a cross slot passage 184. The seat member is retained therein by snap ring 185, but is free to move laterally in the bore for seating alignment with the valve head 179. The fluid under pressure in passage 174 communicates through a central passage 186 in valve element 177 to the chamber 187 between the valve element head 179 and the seat member 182. When the pressure in chamber 187 overcomes centrifugal force acting on valve element 177 to open the valve, the fluid is permitted to flow to the exhaust space 188 and communicates through the clearance and cross slot passage 184, which may be supplemented by axial slots 189 in the perimeter of closure member 182, around and through the closure member to the space 191 between the cylinder block 58 and housing 10 from which it drains to sump 192 and is evacuated through exhaust passage 193. The fluid level in the sump is kept low so the fluid does not contact the rotating cylinder block or other rotating parts. All leakage fluid is drained to the sump 192 as by drain passages 194, 195 which drain control fluid leakage and lubricating fluid via space 191 to sump 192. The internal sump 192 exhaust passage 193 is connected to an external sump 196 or directly to the engine driven pump 197. The engine driven pump 197, at a pressure regulated by the regulator valve 198, supplies fluid under pressure to the supply passage 199 which has a branch 200 to supply other requirements, control system, supercharge system and lubrication and communicates via the transfer passage 201 through the restriction 202 in line 164. A control system and supercharge pressure of about 100 psi is used. The transfer passage 201 conveys fluid from the fixed housing to the rotary shaft to the passage 164 which supplies fluid under pressure to the space between the pistons 154, 161.

The governor valve 176 regulates the pressure downstream of the restriction 202 at a governor pressure proportional to the speed of rotation of the cylinder block. The restriction 202 limits flow to, and exhaust from, the governor valve so there is constant governor pressure in the passages between the restriction 202 and governor valve 176 to act on pistons 154, 161 to bias the cylinder block against the valve plate with a force proportional to speed. This is an auxiliary biasing device to augment the built in cylinder block balance to prevent cylinder block lift off at high speeds to extend the high speed operating range of the hydrostatic machine. The cylinder block is biased toward the valve plate by fluid pressure in the cylinders acting on the difference between cylinder area and the area of ports 92 and counter balanced by the hydrostatic and hydrokinetic sealing and bearing forces occurring between the valve plate surfaces and the adjacent surfaces on the end wall and cylinder block. This balance diminishes with increasing speed due to increasing hydrokinetic bearing forces and is augmented by governor pressure on pistons 154, 161 to prevent incipient lift off which increases leakage and reduces efficiency and, of course, full lift off, a more serious condition causing substantial leakage, loss of power and noise.

Cylinder port 92 as shown in plan view 92a and b in FIG. 8, is as wide as the cylinder and quite large so the flow restriction of this port is minimal. Some cylinder end wall remains radially outward and inward of port 92, so fluid pressure in the cylinder acts on this cylinder end wall to hydraulically bias the cylinder block toward the valve plate to overcome some of the opposing hydraulic forces between the valve plate and cylinder block so the biasing pistons do not need to provide all the bias.

The hydrostatic unit shown in FIG. 1, may be used as the pump and the motor in a hydrostatic transmission, shown in FIG. 2. The pump P and motor M are arranged oppositely with the valve plate and port ends adjacent each other. The pump 206, which is a hydrostatic unit, as shown in FIG. 1, with the shaft 21 rotating in the direction, arrow A, being engine driven shaft 205 driven in the same direction, arrow E, the tilt box tilted as shown in FIG. 1. The high pressure outlet port 108 is connected to a supply line 207 which is connected to the port 102', the low pressure inlet port on the pump but on the motor the high pressure motor inlet port 102' of a similar hydrostatic unit acting as a motor. The port 108, which in the pump was the high pressure outlet port, is in the motor, the low pressure outlet port 108', is connected to the return or low pressure line 208 which in turn is connected to the inlet or low pressure port 102 of the pump. To cause the shaft 21 functioning in FIG. 2, as the transmission driven shaft 210 to rotate, arrow D, in the conventional manner clockwise as viewed from the engine end of the transmission and the same as the input shaft as indicated by arrows E and D, the tilt box of the motor is tilted parallel to the tilt box of the pump. The tilt of the motor tilt box with respect to its valve plate is thus opposite to the tilt of the pump tilt box for forward drive when considered with respect to its valve plate. For a pump the timing valves must be located between the top and bottom dead center positions 92a and 92b respectively in FIG. 8 and the near end of the inlet or outlet port 102 or 108 which the cylinder port is moved toward, whereas for a motor the timing valves must be located at the far end of the port that the cylinder is moving toward. For the same direction of rotation, pump and motor timing valve location must be reversed, mirror image. When the motor valve plate is viewed from the motor shaft end, it will be rotating counterclockwise, port 102, now high pressure motor port 102' and its similarly associated timing valve positioned at the top on the right of center like valve 106 in FIG. 8 but functioning as a predecompression timing valve. The port 107 and a timing valve like valve 114 associated with it would be on the left of bottom center as shown in FIG. 8 and the timing valve would function as a precompression timing valve.

A motor drive in a direction reverse to arrow D may be provided with the FIG. 1 unit used as a motor with the FIG. 8 port and timing valve construction merely by tilting the motor tilt box in the opposite direction. Reverse drive may also be provided if the tilt box angle of the pump is reversed to a position opposite the FIG. 1 position, reversing the high and low pressure ports and lines. The supply line 207 has branch lines 211 and 211' and the return line 208 has branch lines 212 and 212' to connect these pressures to the hydrostatic tilt box bearing of the pump and motor respectively. During driving, line 211 will be the high pressure line and 212 the low pressure line, but on reverse drive and overrun these pressures will be reversed.

Referring to FIGS. 1, 6 and 7, tilt box 39 has a hydrostatic bearing 37 having a central pocket 216, a lower pocket 217 and an upper pocket 218. The lower pocket 217 and upper pocket 218 are inter-connected by a passage 219. The upper pocket 218 is connected by a passage 221 to a passage 222. The passage 221 has a one-way check valve 223 consisting of an annular seat member 224 and a ball 225 which permits flow from the pocket 218 to the passage 222 and prevents return flow. The passage 222, which is downstream of the check valve, is connected to the central pocket 216 and to a crossover passage 226 which extends to a similar hydrostatic bearing 38 on the other side of the tilt box. This hydrostatic bearing 38 has a central pocket 231, a lower pocket 232 and an upper pocket 233. The upper and lower pockets are inter-connected by a passage 234. The upper pocket 233 is connected by a passage 236 to a passage 237. The passage 236 has a similar check valve 238 having an annular seat member secured in the passage 236 and a ball to permit flow from the pocket 233 to the passage 237 and prevent return flow. The passage 237 is connected to the central pocket 231 and to the crossover passage 226. The supply line 207 is connected by branch 211 to the plane bearing 34 on the housing at a point in the center of the pocket 233 when the tilt box 39 is in the zero angle position so that during movement of the tilt box to either extreme angle positions the passage 211 remains connected to the pocket 233. Similarly, line 208, the return line to the pump, is connected by a branch 212 to the surface of the plane bearing 33 at a point which is centrally located with respect to the pocket 218 in the zero angle position as shown in FIG. 7 so that it remains connected to this pocket during all movements of the tilt box.

When the unit is operating as a pump, and the input shaft is rotating in the direction of the arrow A, FIG. 1, so that the supply line 207 and its branch 211 is the high pressure line and the return line 208 and its branch 212 is the low pressure line, the high pressure fluid from the power transfer system will enter via branch 211 to the pocket 233 and via open passage 234 also fill pocket 232. The high pressure fluid in pocket 233 will also flow through check valve 238 to passage 237 and fill pocket 231 so that all three pockets in bearing 38 are pressurized with the high system pressure. This high pressure will also flow from passage 237 to crossover passage 226 to passage 222 closing check valve 223 and supplying high pressure to the central pocket 216. The low pressure fluid supplied from return line 208 via branch 212 fills pocket 218, is blocked by the closed check valve 223 and will flow through passage 219 to pocket 217. Thus in the hydrostatic bearing 37, the central pocket 216 has high pressure fluid therein and the upper and lower pockets 218 and 217 have low pressure fluid. This arrangement provides a larger area of hydrostatic bearing support with high pressure therein on the side of the tilt box subject to the larger force by the operation of the pistons on the tilt box. The other side of the tilt box has a hydrostatic bearing with a small area of high pressure and the remaining area at a low pressure or at zero pressure if the system is not supercharged. This arrangement provides a hydrostatic bearing capacity proportional to the bearing loading and reduces fluid leakage.

When the pressure in the supply and return lines is reversed, as when the load of the vehicle overruns the engine or on reversal of tilt box angle for reverse drive, the check valves automatically reverse their position so that the high pressure is now supplied by line 212 to chamber 218. The high pressure from chamber 218 is supplied by passage 219 to chamber 217 and through check valve 223 and passage 222 to chamber 216 and to crossover passage 226 to close check valve 238 and supply chamber 231. The low pressure line 211 now supplies chamber 233 and through passage 234, chamber 232. Thus, all the chambers 216, 217 and 218 of bearing 37 are supplied with the high pressure and only chamber 231 of bearing 38 is supplied with high pressure while the others 232 and 233 are supplied with low pressure. Thus, on a reversal the high and low pressure ports, due to a reversal of drive causing the pump to operate as a motor on overrun, or also due to a reversal of input drive direction or a change of tilt box angle to reverse the flow through the pump, the bearing capacity is automatically controlled in accordance with the load thereon. This hydrostatic bearing provides the higher pressure or higher area for supporting the higher loaded portion of the bearing so the bearing capacity is proportional to load on each bearing portion. When the hydrostatic unit is operated as a motor, the bearing capacity is similarly controlled proportional to the load thereon.

It will be appreciated that the invention may be made in other modified forms.

I claim:

1. In a hydrostatic pump or motor unit; a housing having a first port and a second port; fluid displacement means having expansible chambers alternately connected to said first and second ports and relatively movable members for expanding and contracting operation of said chambers and said members having a high loading in the portion actuating the chambers connected to the one of said ports having the higher pressure and a low loading in the portion actuating the chambers connected to the one of said ports having lower pressure and variable displacement means for moving one of said members relative to said housing for varying the displacement of said fluid displacement means including hydrostatic bearing means between said one member and housing having a portion having high loading and a portion having low loading operatively connected to said one port having the higher pressure providing a high load capacity in the portion having a high loading varying as a function of said high pressure and a low load capacity in the portion having a low loading varying as a function of said high pressure.

2. The invention defined in claim 1 and said hydrostatic bearing means including means to interchange the portions having a high load capacity and a low load capacity in accordance with an interchange of the ports and bearing portion having the high pressure and load and the low pressure and load.

3. The invention defined in claim 2 and said hydrostatic bearing means including means to supply a high pressure varying as a function of said higher pressure and a low pressure varying as a function of said lower pressure and means operative to increase the hydrostatic bearing area supplied with said high pressure and reduce the hydrostatic bearing area supplied with said low pressure in the portion interchanging from lower load to higher load.

4. The invention defined in claim 1 and said hydrostatic bearing means including pockets in the bearing interface and means connecting the port at high pressure to a large area of pockets in the high loading portion and a small area of pockets in the low loading portion.

5. The invention defined in claim 4 and said hydrostatic bearing means including means connecting the port at low pressure to a pocket area in the portion having low loading.

6. In a hydrostatic pump or motor unit; a housing having a machine axis; a power shaft rotatably mounted on said housing for rotation; valve means on said housing having a first port and a second port on opposite sides of said machine axis; expansible chamber means having a plurality of expansible chambers mounted for rotation about said machine axis for expansion of the chambers on one side of said axis and contraction of the chambers on the other side of said axis for transferring fluid between one port at higher pressure and another port at lower pressure during pump and motor operation; a tilt plate; bearing means rotatably mounting said tilt plate on said housing for rotation about a tilt axis transverse to said machine axis and extending between said opposite sides for tilting said tilt plate relative to said machine axis; drive means operatively connecting said tilt plate to said expansible chamber means for expansion and contraction of said chambers in response to rotation of said expansible chamber means and transmitting a higher load on the side of the port at higher pressure and said bearing means including a first hydrostatic bearing means on the same side of said machine axis as said first port and a second hydrostatic bearing means on the same side of said axis as said second port and supply means operatively connected to said one port at higher pressure and both sides of said bearing means and supplying fluid under pressure varying as a function of said higher pressure to both sides of said bearing means operative to provide a higher load carrying capacity varying as a function of said higher pressure of the hydrostatic bearing means on the same side as the port having the higher pressure than the load carrying capacity varying as a function of said higher pressure of the hydrostatic bearing means on the same side as the port having the lower pressure.

7. The invention defined in claim 6 and said supply means also supplying a fluid under pressure varying with the pressure in the port at lower pressure to the same side as the port having the lower pressure for low load carrying capacity varying as a function of said lower and higher pressure.

8. The invention defined in claim 6 and said supply means supplying fluid under pressure varying as a function of said higher pressure for providing the main bearing support to a larger area of the hydrostatic bearing means on the same side as the port having the higher pressure than the area of the hydrostatic bearing means on the same side as the port having the lower pressure.

9. The invention defined in claim 6 and each of said first and second hydrostatic bearing means having a plurality of pockets at the bearing interface and said supply means connecting the port having the higher pressure to a larger number and area of pockets of the hydrostatic bearing means on the same side and to a smaller number and area of pockets of the hydrostatic bearing means on the other side.

10. In a hydrostatic pump or motor unit; a housing having a machine axis; a power shaft rotatably mounted on said housing for rotation; valve plate means on said housing having a first port and a second port on opposite sides of said machine axis; expansible chamber means having a cylinder barrel mounted for rotation about said machine axis having a plurality of cylinders alternately connected to said ports and a piston in each cylinder reciprocable for expansion of the chamber in each cylinder when on a side of said axis and contraction of the chambers when on another side of said axis and being connected to one port at higher pressure on one side and another port at lower pressure on the other side for transferring fluid during pump and motor operation; a tilt plate; bearing means rotatably mounting said tilt plate on said housing for rotation about a tilt axis transverse to said machine axis and extending between said opposite sides for tilting said tilt plate relative to said machine axis; drive means operatively connecting said tilt plate to each piston for expansion and contraction of said chambers in response to rotation of said cylinder barrel and pistons and transmitting a high load from the pistons on one side connected to the port at high pressure and a low load from the pistons on the other side connected to the port at low pressure and said bearing means including a first hydrostatic bearing means on the same side of said machine axis as said first port and a second hydrostatic bearing means on the same side of said axis as said second port and supply means operatively connected to said one port at higher pressure and to both said bearing means supplying fluid pressure varying with the pressure in said one port at higher pressure to both said bearing means and including means to provide higher load carrying capacity of the hydrostatic bearing means on the same side as the port having the higher pressure than the load carrying capacity of the hydrostatic bearing means on the same side as the port having the lower pressure.

11. The invention defined in claim 10 and said supply means also supplying a fluid pressure varying with the pressure in the port at lower pressure to said hydrostatic bearing means on the same side as said port at lower pressure.

12. The invention defined in claim 10 and said supply means supplying fluid under pressure varying with the pressure in said one port at high pressure and said bearing means including means for providing the main bearing support to a larger area of the hydrostatic bearing means on the same side as the port having the higher pressure than the area of the hydrostatic bearing means on the same side as the port having the lower pressure.

13. The invention defined in claim 10 and each of said first and second hydrostatic bearing means having a plurality of pockets at the bearing interface and said supply means connecting the port having the higher pressure to a larger number and area of pockets of the hydrostatic bearing means on the same side and to a smaller number and area of pockets of the hydrostatic bearing means on the other side.

14. In a hydrostatic pump or motor unit; a housing having a first port and a second port; fluid displacement means having expansible chambers alternately connected to said first and second ports and said members being relatively rotatable about an axis for expanding and contracting operation of said chambers and said members having a high loading in the portion actuating the chambers connected to the one of said ports having the higher pressure and a low loading in the portion actuating the chambers connected to the other of said ports having lower pressure and variable displacement means for rotating one of said members relative to said housing about a transverse axis for varying the displacement of said fluid displacement means including first hydrostatic bearing means and second hydrostatic bearing means respectively axially aligned with said first port and second port and said portion actuating the chambers connected to said first port and said portion actuating the chambers connected to said second port, said first hydrostatic bearing means and second hydrostatic bearing means each having separate first centralized pocket means and second centralized pocket means and bearing fluid supply means to supply fluid under pressure varying as a function of the higher pressure in said one port to said first and second pocket means of the hydrostatic bearing means aligned with said one of said ports having the higher pressure and to said first pocket means of the other hydrostatic bearing means aligned with said other of said ports having lower pressure and to supply fluid under pressure varying as a function of the lower pressure in said other of said ports to said second pocket means of said other hydrostatic bearing means.

15. The invention defined in claim 14 and said bearing fluid supply means being operative in response to an interchange of lower pressure and higher pressure in said first port and second port to interchange the supply of said fluid under pressure varying as a function of said higher pressure and the supply of said fluid under pressure varying as a function of said lower pressure to said second pocket means of said first hydrostatic bearing means and said second pocket means of said second hydrostatic bearing means.

16. The invention defined in claim 1 and each portion of said hydrostatic bearing means having first pocket means and second pocket means, each of said pocket means being centralized relative to the load, bearing fluid supply means to supply a bearing pressure varying as a function of the higher pressure to both pocket means of the portion having a high load and to one pocket means of the portion having a low load.

17. The invention defined in claim 16 and low pressure bearing fluid supply means to supply a pressure varying as a function of the lower pressure to the other pocket means of the portion having a low load.

* * * * *

PO-1050
(5/69)

UNITED STATES PATENT OFFICE
CERTIFICATE OF CORRECTION

Patent No. __3,779,137__  Dated __December 18, 1973__

Inventor(s) __Erkki A. Koivunen__

It is certified that error appears in the above-identified patent and that said Letters Patent are hereby corrected as shown below:

In the specification, column 7, line 19, "valve" should be -- These --.

Signed and sealed this 14th day of May 1974.

(SEAL)
Attest:

EDWARD M. FLETCHER, JR.
Attesting Officer

C. MARSHALL DANN
Commissioner of Patents